Jan. 10, 1939.  R. H. WHITEHEAD  2,143,293
ELECTRIC CLOCK
Filed Aug. 17, 1931
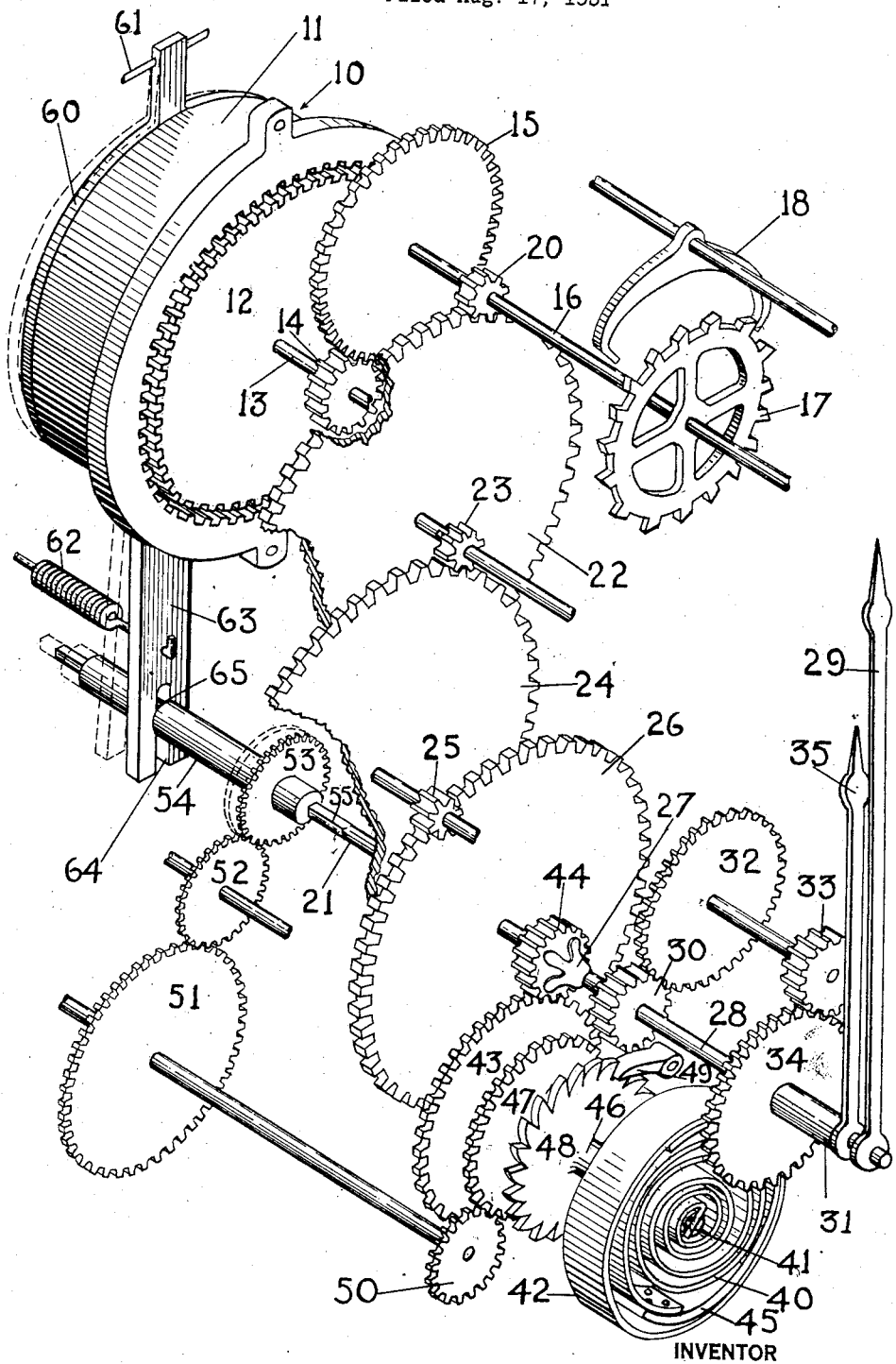
INVENTOR
BY Richard H. Whitehead
Watson, Bristol, Johnson & Leavenworth
ATTORNEY Patented Jan. 10, 1939

2,143,293

UNITED STATES PATENT OFFICE 2,143,293

ELECTRIC CLOCK

Richard H. Whitehead, New Haven, Conn., assignor to The New Haven Clock Co., New Haven, Conn., a corporation of Connecticut Application August 17, 1931, Serial No. 557,450

3 Claims. (Cl. 58—26)

This invention relates to electric clocks. In clocks which are designed to run synchronously from an alternating curent power line, it is possible to maintain the time accurately by adjustment of the frequency, so long as there are no interruptions of current. Many power lines, however, find it difficult to run continuously and to maintain the power through the distributing lines to the customer without any interruption, and since each interruption involves a complete stoppage of the clocks, there results an accumulated error rendering the indicated time inaccurate.

Attempts to overcome this difficulty by a spring motor which will maintain the clock in operation during the cessation of power have involved new difficulties.

The use of ratchets between the spring clock mechanism and the indicating hands and between the synchronous motor mechanism and the indicating hands permits the synchronous motor to drive the hands whenever the clock is stopped and permits the clock to drive the hands whenever the synchronous motor is stopped. With this construction, however, the spring clock mechanism will over-run the synchronous motor mechanism should it be set to run a little too fast, unless a special stopping mechanism be provided.

With such a system there is a tendency to forget to wind the spring motor mechanism because the regular operation of the clock does not depend upon it. It thus promotes a sense of security which is not justified.

Such a system, moreover, requires the use of self-starting synchronous motors which, for some purposes, are not the most desirable type of motor to use in operating a clock. The use of the simpler and more reliable types of non-self starting synchronous motor, however, makes it necessary to employ a special starting mechanism to start the motor after each cessation of power.

In accordance with this invention, it has been found that the advantages of a properly regulated spring motor to operate the clock during interruptions of power can be obtained while at the same time maintaining the accuracy and simplicity of operation of a non-self starting synchronous motor clock.

An escapement mechanism, such as is employed to regulate the time in many spring motor clocks, may, I have discovered, be caused, by an excess of power, to over-run its normal speed, and by a deficiency of power it may be caused to lose. Thus if a synchronous motor be connected by a proper gear train to the time train of a spring motor clock of a suitable capacity, the accuracy of the spring motor clock will not be affected so long as no power is applied to the synchronous motor. This principle is relied upon in maintaining the accuracy of the time indication during periods of cessation of power.

When, however, current is supplied to the synchronous motor, it at once assumes domination of the speed of indication, because the power supplied by it is so greatly in excess of that derived from the spring motor. Thus if the relative speed of the synchronous motor is slightly in excess of the speed for which the escapement is adjusted, the excess of power will cause the escapement to speed up sufficiently to equal the speed of the motor. In the case of a balance wheel escapement this is readily accomplished by causing the balance wheel to bank or rebound at the end of each half revolution.

On the other hand should the speed of the synchronous motor be slightly less than that of the escapement, the latter will be held back by the synchronous motor until the escapement wheel loses a beat. In this way so long as the power is supplied to the synchronous motor, the indication of the hands of the clock will correspond to the synchronous speed.

A practical embodiment of this invention is diagrammatically shown in a perspective in the drawing.

The numeral 10 designates generally a synchronous motor having a stator 11 and a rotor 12 energized by a suitable coil not shown. The rotor 12 is journalled about an axis 13. This rotor is arranged to drive an escapement wheel 17 in any convenient manner known to the art. As here conventionally shown the shaft of the rotor 12 carries a pinion 14 meshing with a gear 15, upon a shaft 16 which carries the escapement wheel 17. An escapement arm 18 controlled by a suitable isochronous device, such as a balance wheel, not shown, is pivoted in position to cooperate with the escapement wheel 17. A pinion 20 also on the shaft 16 is geared to the shaft 21 through the medium of gear 22, pinion 23, gear 24, pinion 25 and gear 26, which in turn is mounted upon the shaft 21.

The shaft 21 is connected by a suitable friction device or slip connection 27, with the minute hand shaft 28 upon which the minute hand 29 is mounted. This slip connection 27 is to permit the setting of the hands in the usual manner. A pinion 30 mounted upon the shaft 28 drives the hour hand sleeve 31 through the medium of back gears 32, 33 and 34 and the hour hand 35 is fast or frictionally carried upon the sleeve 31. With this construction it will be clear as previously described that the synchronous motor can drive the clock hands at a proper speed notwithstanding the escapement 17.

The mechanism for maintaining the speed of the clock and motor during cessations of power comprises a spring 40 fixed upon a central shaft 41 and carried within a drum or housing 42. The shaft 41 has fixed upon it a gear 43 meshing with a pinion 44 upon the shaft 21.

The outer end of the spring 40 carries a friction member 45 substantially arcuate in form adapted to bear frictionally against the interior of the drum 42 with sufficient force to wind the spring when the housing is rotated, but to permit slipping of the friction member relative to the housing when the spring is completely wound.

The drum 42 is provided with an axial tubular extension 46 carrying a gear 47 and a ratchet wheel 48. This latter cooperates with a pawl 49 to hold the spring wound whenever tension upon the gear 47 is released. The gear 47 meshes with a pinion 50 on the same shaft with a gear 51 which in turn meshes with a gear 52 adapted to be driven by a gear 53, in turn driven from the shaft 21. The mechanism comprising the gears 47, 50, 51, 52 and 53 is for the purpose of winding the spring 40 from the synchronous motor, while the gears 43 and 44 are for the purpose of driving the clock from the spring 40 whenever power to the synchronous motor fails.

It will be understood that the gear ratio for winding the spring is slightly higher than the gear ratio by which the spring drives the clock, so that while normally driven by the synchronous motor, the spring will be wound slightly faster than it is permitted to unwind. This difference is for the purpose of making up for such time as the clock may be driven by the spring motor while the power is off of the synchronous motor; the slip member 45 is provided to prevent overwinding of the spring.

Means are provided for disconnecting the spring-winding mechanism at such times as the power is off of the synchronous motor. To this end the gear 53 is carried upon a sleeve 54 which is splined to the shaft 21. As illustrated, the end of the shaft 21 may be squared as shown at 55 to slide within a corresponding female surface within the sleeve 54.

Means are provided for sliding the sleeve 54 axially to bring the gears 53 and 52 into and out of mesh, dependent upon the application of electrical power to the motor 10. This is diagrammatically illustrated by providing an armature 60 pivoted to the frame at 61 in position to bear against the rear face of the stator 11 and to be attracted by the magnetic force of said stator whenever power is applied thereto. A spring 62 operating upon an extension 63 of the armature holds the armature away from the stator whenever power is off of the field 11. The extension 63 has a slot 64 fitting over a groove 65 in the sleeve 54 so that as the arm 63 is pulled back by the spring 62, it pulls the gear 53 axially out of mesh with the gear 52.

With this construction it will be clear that the spring 40 will be wound directly from the synchronous motor through the gears 53 and 52 whenever the armature 60 is attracted by the flux of the motor, but the power required for this purpose will be diminished because a portion of this power is being returned to the shaft 21 through the gears 43 and 44. For these reasons it is possible to utilize a much stronger spring than it would be practical to wind from the motor direct, if it were not for this assistance which the unwinding of the spring itself gives.

It will be clear from the foregoing that if power be kept continuously upon the synchronous motor that the spring 40 will be wound completely and that thereafter there will be a continuous slippage of the friction member 45 within the casing. This is of no importance, however, in view of the fact that the power of these synchronous clock motors is considerably in excess of that required to drive the clock.

As soon, however, as the power goes off of the line, the spring 62 pulls back the armature 60, disconnecting the gears 52 and 53; thereupon the ratchet 49 immediately prevents unwinding of the drum 42. The motive power for driving the clock now comes from the spring 40 through the gears 43 and 44, and the time control comes from the escapement 17 which by proper regulations may be caused to keep the clock in proper time even over a protracted period of cessation of electric power.

It will be noted that the escapement mechanism is kept in constant operation during the synchronous motor drive and hence does not have to be started by artificial means when the power fails and at the same time the synchronous motor is kept in proper speed by the spring during periods of cessation of power and hence does not require any starting mechanism when the power is again applied.

Moreover, it will be observed that no ratchet mechanisms are utilized in the clock drive so that there is no possibility of the spring motor causing the clock to overrun while power is applied to the synchronous motor, and there is no chance of the escapement failing to start at cessation of power because it is kept in constant motion.

It is desirable to eliminate as far as practical all friction in the gearing and pinions, particularly of the high speed gears and shafts, and to utilize a low speed motor in order to facilitate the drive of the synchronous motor rotor from the spring.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:—

1. In a clock, in combination, a shaft, a spring motor, releasing means connecting said motor to said shaft for driving said shaft, an escapement for controlling said releasing means, means operable by said shaft for winding said motor whereby said motor is released and wound by the rotation of the same shaft, said winding mechanism having a higher gear ratio than said releasing means, power means for driving said shaft and means controlled by the application of power to said power means for connecting and disconnecting said winding mechanism.

2. In a clock, in combination, a shaft, a spring motor, releasing means connecting said motor to said shaft for driving said shaft, an escapement for controlling said releasing means, means operable by said shaft for winding said motor whereby said motor is released and wound by the rotation of the same shaft, said winding mechanism having a higher gear ratio than said releasing means and slip means for preventing overwinding of said motor, power means for driving said shaft and power operated means for connecting said winding means.

3. An electric device having a timing function including a synchronous motor, a spring motor, mechanism for utilizing the timing function, gearing for connecting said synchronous motor to said spring motor and to said mechanism, said gearing having a connection for driving said mechanism from said spring motor, and a connection for winding said spring motor from said synchronous motor including a gear and means responsive to the application of power to said synchronous motor to shift the gear to disconnect the winding connection.

RICHARD H. WHITEHEAD.